US006925496B1

(12) United States Patent
Ingram et al.

(10) Patent No.: US 6,925,496 B1
(45) Date of Patent: Aug. 2, 2005

(54) METHOD OF ENHANCING HYPERLINKS BY ADDING USER SELECTABLE FUNCTIONS TO HYPERLINKS FOR CAPTURING DISPLAYABLE ELEMENTS AND THE URL ASSOCIATED WITH THE HYPERLINKS AND DISPLAYING A LINK SNAPSHOT BASED ON THE HYPERLINK

(75) Inventors: Gerald W. Ingram, Mt. Sterling, KY (US); Steve Mansfield, Lexington, KY (US)

(73) Assignee: I-LOR, LLC, Lexington, KY (US)

( * ) Notice: Subject to any disclaimer, the term of this patent is extended or adjusted under 35 U.S.C. 154(b) by 0 days.

(21) Appl. No.: 09/594,786

(22) Filed: Jun. 16, 2000

(51) Int. Cl.[7] ............................................. G06F 15/173
(52) U.S. Cl. ........................ 709/224; 709/223; 709/200; 345/866; 345/769; 345/854
(58) Field of Search ................................ 709/200, 224, 709/223; 707/501; 345/866, 769, 854, 339, 357

(56) References Cited

U.S. PATENT DOCUMENTS

| 5,446,891 A | | 8/1995 | Kaplan et al. | |
| 5,603,025 A | | 2/1997 | Tabb et al. | |
| 5,694,561 A | * | 12/1997 | Malamud et al. | ........... 345/805 |

(Continued)

OTHER PUBLICATIONS

Newfield et al, "Scatchpad : Mechanisms for Better Navigation in Directed Web Searching", ACM 1998.*
Zellweger et al, "Fluid Links for Informaed and Incremental Link Transitions", ACM 1998.*

Microsoft's Homepage , Feb. 28, 2000.*

Linux–Hacker.net Homepage, May 10, 2000.*

*Primary Examiner*—H Alam
*Assistant Examiner*—Philip B. Tran
(74) *Attorney, Agent, or Firm*—Venable LLP; Michael A. Sartori

(57) ABSTRACT

An enhanced hyperlink and method for providing an enhanced hyperlinked are provided. This invention permits the user to interact with a hyperlink in a variety of ways without necessarily having to open and/or follow the hyperlink. This is accomplished by detecting the presence of a cursor near a hyperlink. When the cursor has remained near the hyperlink for a predetermined time period, a toolbar is displayed containing one or more link enhancements that the user may select. In response to the users' selection of a particular link enhancement, then that link enhancement function would be performed without requiring the any further action. Examples of link enhancement include, but are not limited to, opening the selected link in a new window; opening the selected link in a new window with that window minimized; creating a clickable graphic/text string, and/or icon that would enable the user to return to the selected link at a later time, or anchor the current page by creating an icon or other clickable item that would return the user to the current page; or view off-line which would, in the background download the files associated with the selected link to a memory device for viewing later off-line.

13 Claims, 7 Drawing Sheets

U.S. PATENT DOCUMENTS

| | | | | |
|---|---|---|---|---|
| 5,708,825 A | | 1/1998 | Sotomayor | |
| 5,742,768 A | * | 4/1998 | Gennaro et al. | 709/203 |
| 5,745,360 A | | 4/1998 | Leone et al. | |
| 5,761,436 A | | 6/1998 | Nielsen | |
| 5,787,416 A | | 7/1998 | Tabb et al. | |
| 5,794,257 A | | 8/1998 | Liu et al. | |
| 5,802,299 A | | 9/1998 | Logan et al. | |
| 5,806,077 A | | 9/1998 | Wecker | |
| 5,809,250 A | | 9/1998 | Kisor | |
| 5,809,317 A | | 9/1998 | Kogan et al. | |
| 5,838,317 A | * | 11/1998 | Bolnick et al. | 345/339 |
| 5,855,015 A | | 12/1998 | Shoham | |
| 5,870,767 A | | 2/1999 | Kraft, IV | |
| 5,914,714 A | * | 6/1999 | Brown | 345/339 |
| 5,917,491 A | * | 6/1999 | Bauersfeld | 345/810 |
| 5,920,859 A | | 7/1999 | Li | |
| 5,931,912 A | | 8/1999 | Wu et al. | |
| 5,968,125 A | | 10/1999 | Garrick et al. | |
| 5,978,848 A | | 11/1999 | Maddalozzo, Jr. et al. | |
| 5,982,445 A | | 11/1999 | Eyer et al. | |
| 5,983,244 A | * | 11/1999 | Nation | 707/501 |
| 5,995,102 A | * | 11/1999 | Rosen et al. | 345/339 |
| 5,995,756 A | | 11/1999 | Herrmann | |
| 6,014,678 A | | 1/2000 | Inoue et al. | |
| 6,018,345 A | * | 1/2000 | Berstis | 345/357 |
| 6,026,437 A | | 2/2000 | Muschett et al. | |
| 6,044,384 A | | 3/2000 | Ishima et al. | |
| 6,044,385 A | | 3/2000 | Gross et al. | |
| 6,049,326 A | | 4/2000 | Beyda et al. | |
| 6,061,695 A | | 5/2000 | Slivka et al. | |
| 6,061,701 A | | 5/2000 | Hirai et al. | |
| 6,081,815 A | | 6/2000 | Spitznagel et al. | |
| 6,088,707 A | | 7/2000 | Bates et al. | |
| 6,091,409 A | | 7/2000 | Dickman et al. | |
| 6,133,915 A | * | 10/2000 | Arcuri et al. | 345/339 |
| 6,141,010 A | * | 10/2000 | Hoyle | 345/357 |
| 6,161,126 A | * | 12/2000 | Wies et al. | 709/217 |
| 6,195,097 B1 | * | 2/2001 | Shrader et al. | 345/356 |
| 6,211,874 B1 | * | 4/2001 | Himmel et al. | 345/810 |
| 6,278,448 B1 | * | 8/2001 | Brown et al. | 345/866 |
| 6,338,075 B2 | | 1/2002 | Fukuda | |
| 6,429,880 B2 | | 8/2002 | Marcos et al. | |
| 6,518,983 B1 | | 2/2003 | Grohmann et al. | |
| 2003/0030679 A1 | * | 2/2003 | Jain | 345/854 |

* cited by examiner

METHOD OF ENHANCING HYPERLINKS BY ADDING USER SELECTABLE FUNCTIONS TO HYPERLINKS FOR CAPTURING DISPLAYABLE ELEMENTS AND THE URL ASSOCIATED WITH THE HYPERLINKS AND DISPLAYING A LINK SNAPSHOT BASED ON THE HYPERLINK

This application claims the benefit of U.S. Provisional Application No. 60/202,029, filed May 4, 2000.

BACKGROUND OF THE INVENTION

1. Field of the Invention

This invention relates to the field of hyperlinks and computer applications utilizing hyperlinks, and more specifically, relates to software that enhances hyperlinks.

2. Description of the Related Art

The Internet is a fast growing and important communication medium. One integral and familiar aspect of utilizing the Internet is an application called a "browser". This application, by translating HTML and other related programming code into text and graphics, allows virtually anyone interested in using the Internet to use this amazing tool easily and simply. One of the most used and familiar aspects of Internet browsers is the "hyperlink". A hyperlink is simply a string of text or a computer graphic that a user can "click" with the mouse pointer, which will immediately load a new browser page that the hyperlink is programmed to present to the user. Without hyperlinks, the Internet could not be utilized by users with the ease, simplicity and speed that it is today. Hyperlinks are an inextricable part of the Internet browsing experience, and will be for the foreseeable future.

One of the ways that hyperlinks are used is in the form of "advertising banners" for Internet web sites. Hyperlinks are attached to graphical advertisements on virtually all commercial web sites. The world wide web and banner ads have been intrinsic to the success of each other. Banners are the economic fuel that runs the massive Internet engine. Without banners, the Internet could not afford to function in it's current form. There are virtually no successful web sites that don't run banner advertisements as a way to finance their business. Probably no other on-screen element is more prevalent on the Internet as the old stand-by, the banner ad.

As a result of the utilization and success of the hyperlink on the Internet, the hyperlink has become a common navigation tool "off line" as well. Hyperlinks are utilized to navigate through electronic documents and files of all kinds. For example, interactive games, electronic and/or CD-ROM based encyclopedias, and corporate documents just to name a few.

As successful as the hyperlink concept has been, there still are problems. As of today, hyperlinks still only do one thing; if you click on them, they move you to a new location. This is often a problem. Because of the vast complexity of the Internet and/or electronic documents and files, giving users the constant ability to follow hyperlinks from one page to another (while giving users great benefit) often results in users losing their train of thought and getting lost in the billions of possible pages, documents, and/or files available, reducing their ability to extract the information they are looking for. For example, lets say a user has delved deeply into a web site about automobiles. Usually, each page is filled with hyperlinks offering the user other places to go related to cars, some within the current web site, some that will take the user to other related web sites. Now the user is faced with a decision. Which hyperlink to chose? It's important, because if he selects one that eventually takes him to a place he really wasn't interested in going, it's often difficult to get back to the original page from which he left. While there are some ways to minimize this problem using modern browsers, there is no easy way to prevent the users from losing their train of thought or simply "getting lost" while clicking hyperlinks. This also translates to a waste of time (and money for commercial users) and energy for users, and an often inefficient method of browsing the web.

Anyone that has followed the evolution of the Internet over the last five years knows that the Internet of 1996 bears little resemblance to the Internet of the year 2000. Today's Internet is bolder, more graphical, faster and largely multi-media based. But what about the hyperlink and related banner ad? Incredibly, the hyperlink of 1996 is pretty much the same one we are looking at here in the year 2000. Hyperlinks have not really changed with the times. Why? There are many reasons, but it certainly isn't because they are such a successful formula. Even today, with advertisers spending over $2 billion in 1999 on hyperlink banner ads, the "click-through" rates for banner ads is a lowly 1%. With this kind of performance, there is a need for an improved hyperlink that provides the user with the ability to do more with a hyperlink than click to move to a new page.

SUMMARY OF THE INVENTION

The present invention solves this problem by providing an enhanced hyperlink that provides the user the ability to choose additional interactions with the hyperlink. To solve this problem, an application based on the Java programming platform (allowing the application to run on virtually any computer regardless of operating system) was created. This application is dedicated to making hyperlinks (and thus by default, banner ads) more powerful and useful to Internet, electronic document, or other hyperlink users. This tiny (in terms of computer memory and screen space) application is designed to enable users to keep their train of thought intact while simultaneously taking advantage of the power of hyperlinks. It accomplishes this by (a.) enabling users to take advantage of a multiple option set related to saving the hyperlink for viewing at a later time and (b.) enabling users to take advantage of a multiple option set related to saving the original web page for viewing at a later time, while following a hyperlink. These two simple concepts actually close the loop for hyperlink usage. With an Enhanced Hyperlink, no matter how a user decides to utilize a hyperlink, Enhanced Hyperlink retains the users original thought process, so the user cannot "get lost", or forget what started the Internet, electronic document, or other hyperlink journey in the first place. Enhanced Hyperlink enables users to either continue on a particular path on the web, while saving compelling hyperlinks for later use, and/or break away from a particular path on the web to follow a hyperlink, while saving the original path for later use.

The invention provides a method for enhancing a hyperlink and an enhanced hyperlink. First, the presence of a pointer near a hyperlink is detected. Next, a toolbar is displayed when the pointer remains near the hyperlink greater than a predetermined time. The toolbar displayed provides at least one choice for a link enhancement.

BRIEF DESCRIPTION OF THE DRAWINGS

The accompanying drawings incorporated in and forming part of the specification illustrate several aspects of the present invention, and together with the description, serve to explain the principles of the invention. In the drawings.

Figure 1:
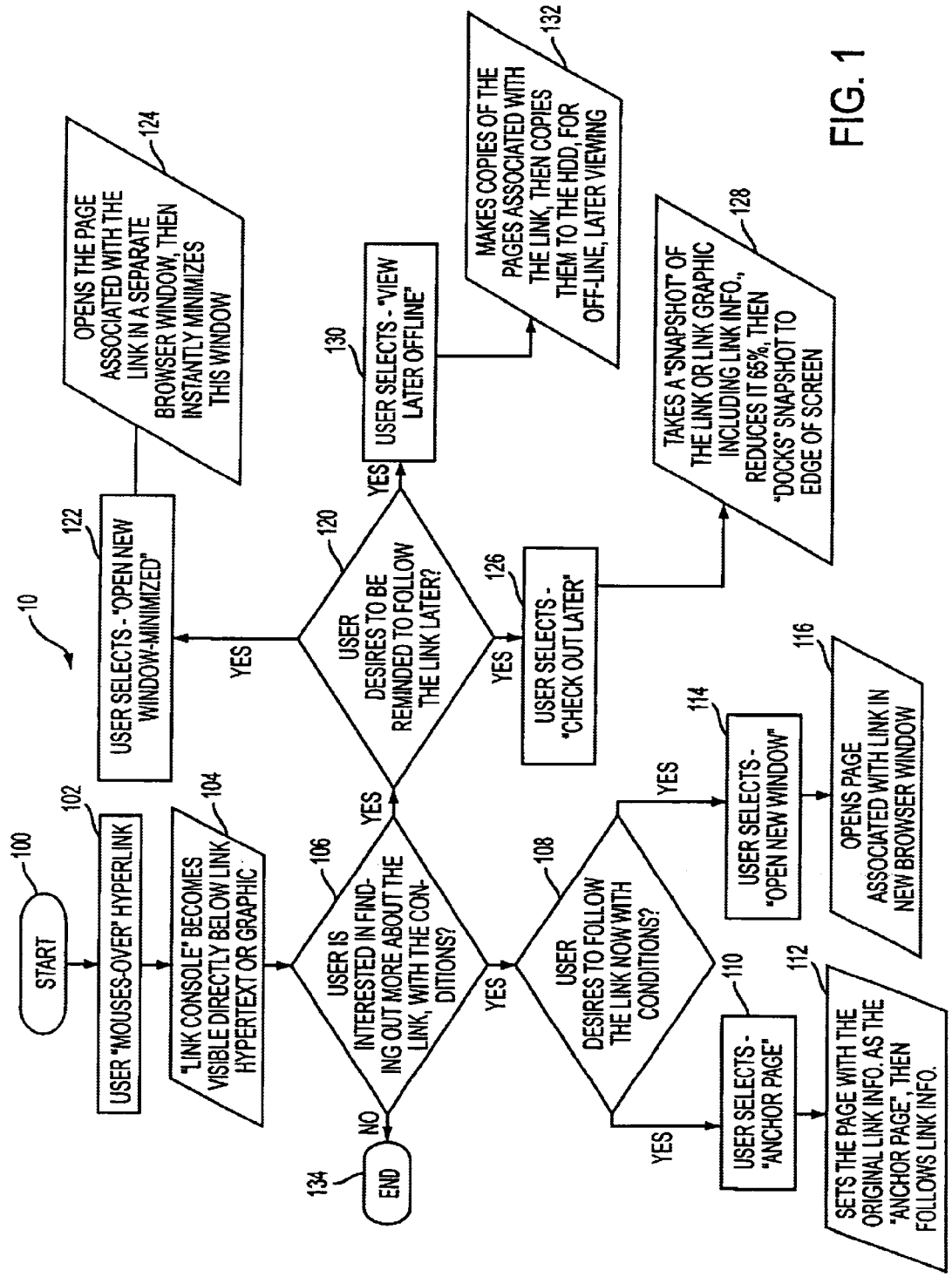
FIG. 1 illustrates an exemplary functional flow chart for the present invention.

Reference will now be made in detail to the present invention examples which are illustrated in the accompanying drawings.

DETAILED DESCRIPTION OF THE INVENTION

Definitions

The following definitions apply to this disclosure and the appended claims:

toolbar—any graphic user interface presented to users as part of an Enhanced Hyperlink.

Examples include, but are not limited to a visual clue and/or menu.

page—any web page, electronic document, file, screen display, or other location a user may access with a hyperlink.

browser—any application that permits a user to view a page containing hyperlinks and to navigate within the page or to another page by utilizing hyperlinks.

cursor—any portion of a graphic user interface that permits the user to interact with a hyperlink.

Pointer—any portion of a graphic user interface that permits the user to interact with a hyperlink.

pointing device—a mouse, track ball, keyboard or other device employed to move a cursor or pointer on a display.

function—any subroutine, executable file, applet, serviet, plug-in (Netscape Navigator), active x-control (Mcrosoft Internet Explorer), or other executable software and/or script.

Overview

The Enhanced Hyperlink created in computer code written in compiled Java that is represented most commonly, but not limited too, on the users computer screen in a graphical metaphor that is often referred to as a "toolbar". This toolbar can be graphically represented in a variety of designs, sizes and color schemes without reducing or enhancing the actual functionality of the Enhanced Hyperlink. Further, Enhanced Hyperlink is designed in a manner that allows individual web site designers to change the graphical look and feel of the Enhanced Hyperlink to closely match the colors and theme of their individual web sites, without changing Enhanced Link functionality. This is to enable an Enhanced Hyperlink to seamlessly integrate into any web site, without detracting from the user experience.

The Enhanced Hyperlink toolbar may be designed to appear when a user "mouses-over" a hyperlink. Alternatively, the toolbar may display with the page or the toolbar may appear when the cursor or pointer is in a predetermined area around the hyperlink. Preferably the toolbar is presented to the user instantly on mouse-over, or after the user keeps the mouse pointer on the hyperlink (or banner ad) for a predetermined time, for example one to three seconds. A short time delay prevents the browser from becoming jumbled with too much information if the user simply desires to click through on any given hyperlink Once the toolbar is in view the user is presented with a number of options in addition to the simple "click on the hyperlink and visit a new web page" that is currently in use. Again, the Enhanced Hyperlink allows the user to look at the content later, rather than lose a train of thought. This concept alone is incredibly powerful.

The Enhanced Hyperlink system enables users to:

"Check the Hyperlink (or Banner AD) out later". This feature takes a "snapshot" of the hyperlink (including it's link information), capturing a copy of any hyperlink, including a string, graphic or banner advertisement (may shrink graphics to 35% of their original size) and may then "dock it" (a function that attaches the graphic to the edge of the operating systems desktop) to the edge of the computer screen. This now docked graphic can be moved to any location on the screen the user desires, in order to take full advantage of viewable area. It has the capability to dock several hyperlinks (text, graphics or banners) stacked on top of each other. Each of these docked hyperlinks, since they still contain all of their original hyperlink code information, can be activated and clicked through at any given time by the user, or deleted from the screen at any time. The system also enables the user to automatically delete these docked hyperlinks at time intervals that the user can select.

"Open the Hyperlinked Page in a window and minimize to the taskbar". When this feature is selected, the user only sees' a new item residing in the "taskbar" (a graphical element used by operating systems to let users see which applications are currently running on the desktop) that references the web page connected to the hyperlink selected. This new item is actually the page the hyperlink is connected too, so selecting this feature will enable users to view the page referenced by the hyperlink at any given time in the session the user chooses, simply by clicking on the icon labeling it (thus making this new page the active, visible page on the desktop) in the taskbar of the operating system in use.

"Anchor (remember) the current page". This feature enables users to "anchor" the page they are currently visiting. This means that Enhanced Hyperlink will store the current pages' address in memory and attach this address to a small graphical element or icon, which will "dock" on the edge of the computer screen, which will be the user's "anchor". Then the user can click through on a hyperlink, explore anywhere on the Internet or other hyperlinked media they desire, then when they are ready to return to the page of origination, or anchor page, they simply click on the "anchor" icon to be presented with the page that originally contained the hyperlink that began the exploration.

"Open the Hyperlinked Page in a new browser window at a predetermined and/or smaller size than the original window". This feature enables users to click through on a hyperlink, which will present the page referenced by the hyperlink in a new window. This enables users to view the page referenced by the hyperlink while keeping the original web page visible in the background for instant re-visiting.

Many other enhancements are possible using this tool. One that is illustrated here is the ability to "Save the hyperlinked page for later viewing off-line". This feature, invisibly to the user, saves the pages referenced by the hyperlink to the users hard drive for later viewing at the users discretion. This is beneficial to any user, but particularly to users with slow connections to a network. This feature enables users to see what the hyperlink would have presented to them while they were on-line, even if the user doesn't have a live network connection at the time of this later viewing, because the pages are saved to the users' local hard drive.

With the Enhanced Hyperlink, a simple hyperlink is exponentially more powerful than before. Relevant to a banner ad, without asking the advertiser or the media on which the advertisement is presented to change anything, the Enhanced Hyperlink has made the advertisement stronger and more valid for a potential customer. By not making the user actually lose a train of thought by clicking on a traditional hyperlink or banner ad, this application has increased the likelihood that the hyperlink will be used, or the advertisement will be seen, significantly adding to the value of each link and/or ad. The same holds true for any type of hyperlink.

With an Enhanced Hyperlink, many of the reasons for not utilizing a hyperlink are eliminated. The Enhanced Hyperlink significantly improves and empowers the users browsing experience compared to browsing without an Enhanced Hyperlink.

As discussed above, the enhanced hyperlink may be provided through an application or subroutine running as part of or in concert with a browser. Alternatively, the enhanced hyperlink may be provided as part of a banner ad or other link employing a JAVA applet, servelet, or embedded program.

Figure 2:
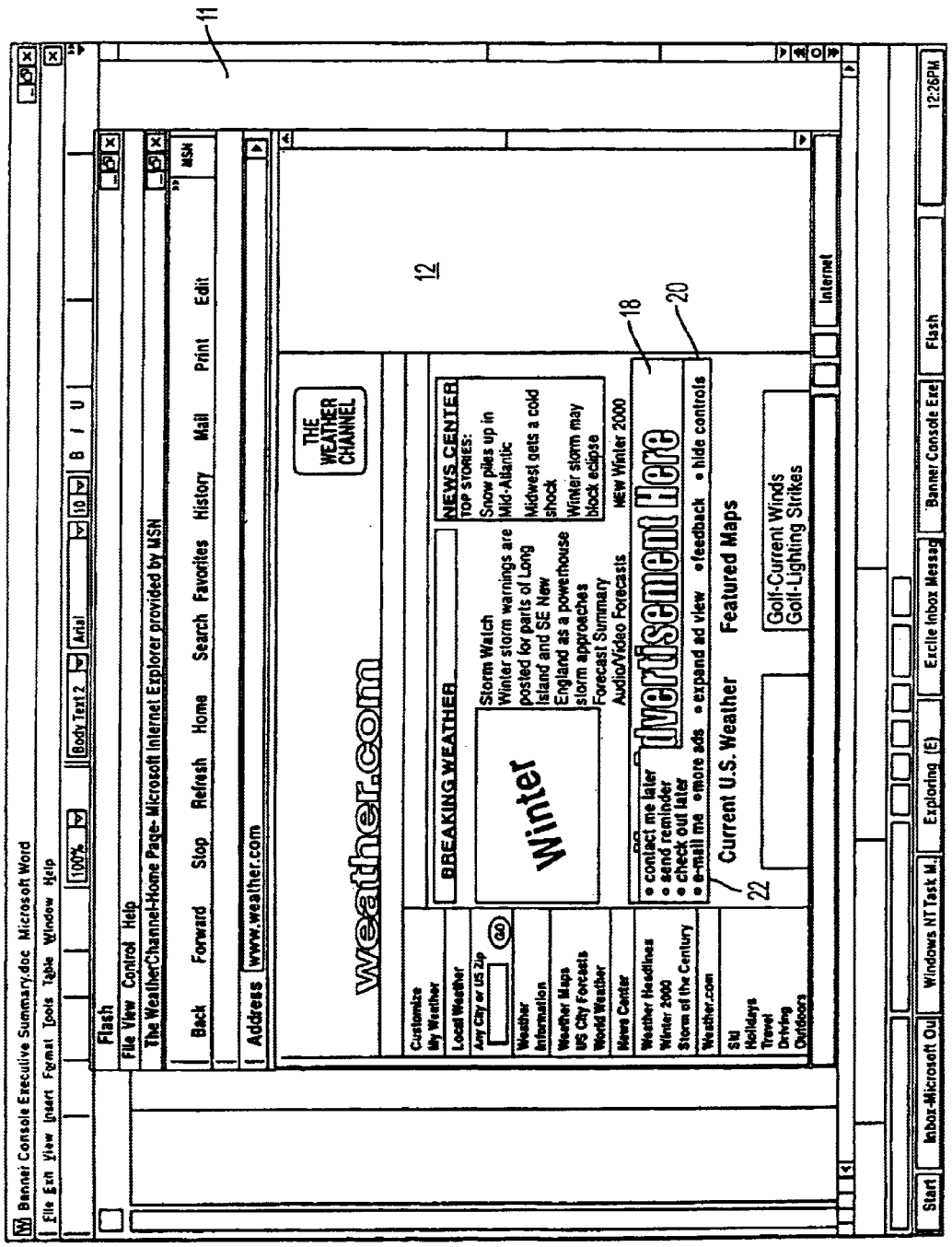
FIG. 2 illustrates a sample toolbar that may be displayed by the invention of FIG. 1.

FIG. 1 illustrates an exemplary functional flow chart for an enhanced hyperlink 10. The illustrated functional flow chart begins at Start 100. At this point, a page containing hyperlinks would be displayed for the user. Thereafter, the user selects a hyperlink in block 102 by moving a cursor either "over" or near a hyperlink that the user wishes to select. When the cursor is "over" or near a hyperlink, the program displays a toolbar which illustrates the link enhancements available for that particular hyperlink in block 104. The program may wait a period of time, for example, three seconds, after the pointer is placed "over" or near a selected hyperlink. In some embodiments the toolbar may be displayed as part of or with the hyperlink. FIG. 2 illustrates one example of toolbar 20 on a simulated page 12 on display 11. With the tool bar displayed, the user may select which link enhancement they desire to utilize, if any. Decision Block 106 represents the user selection process.

If the user does not desire to use any of the link enhancements, then the user may either click on the hyperlink and follow that link or the user may move the cursor away from the link and the toolbar may be hidden. In either case, the functional flow will terminate at end 134. With the link enhancement graphic user interface displayed in block 104, the user may select one of the link enhancements from the toolbar. Exemplary choices are illustrated in blocks 110, 114, 122 and 126. Decision blocks 106, 108 and 120 reflect the choices that a user may make in selecting a link enhancement. Decision block 106 represents the user wanting to utilize one of the link enhancements to interact with the hyperlink. Decision block 108 represents the user's desire to follow the selected link and decision block 120 illustrates a user's desire to follow the selected link at a later time.

When the user desires to follow the selected link in decision block 108, two link enhancements are shown to provide examples of these type of link enhancements. The one enhancement may be activated when the user selects "anchor page" represented by block 110. The current page is set as an "anchor page" and the selected link followed. Consequently, the page associated with the selected link is displayed in block 112.

An anchor page is a clickable item placed on the tool bar, the desk top or some other convenient location. This clickable item is associated with or has as one of its properties, the uniform resource locator (URL) of the page that the user was viewing, i.e. the page prior to following the selected link. This "anchor page" provides an easy one click method for the user to return to this page. Consequently, the user is saved both the time and effort of clicking the back button a sufficient number of times to return the user to this page after following the selected link or from having to remember the URL of the page that they were on prior to following a selected link.

The second illustrated link enhancement may be accessed by the user selecting the open a new window enhancement in block 114. This selection causes a new browser window to be opened and display the page associated with the selected link in the new browser window. Blocks 114 and 116 perform in essence the same functions that are performed when the user places the cursor over a hyperlink, "right clicks" the hyperlink and then selects and clicks on the open new window command from the menu displayed (Netscape Navigator running on Windows 98). The advantage provided by the present invention is that the user can open the new window with just a single click.

Decision block 120 represents the user's desire to return to the selected link at a later time without losing their current train of thought or place on the current page. Three exemplary enhancements are presented for illustration in Blocks 122, 126 and 130. For example, the user may select open new window minimized from the exemplary toolbar 20 displayed in Block 104. This selection in Block 122 causes a new browser window to be opened with the page associated with the selected link displayed in that browser window. When this browser window is opened in block 124, the window automatically is minimized so that the user may continue to view the current page with a minimum of distraction. The minimized window, however, enables the user to quickly and easily access the selected hyperlink with a single click at a later time. While current browsers enable the user to perform a similar function by right clicking on the link and then clicking on the "open in new window" menu selection to display the selected page in a new browser window, however, the user would then have to manually minimize this browser window. Thus, the present application enables the user to accomplish in a single click what might otherwise take three or more user actions. The more user actions taken by the user, the greater the distraction from viewing the current page.

The second illustrated enhancement is the "check out later" selection illustrated in block 126. When the user makes this selection, the enhancement captures the graphic and/or text and link data associated with that hypertext link. The graphic and/or text may then be reduced to a smaller size. A clickable item is created and is associated with or has as its properties, the captured link data including the uniform resource locator (URL) of the page associated with the selected link. Typically, this image is approximately the size of one of the standard icons displayed on a Windows-style desktop. The program may also position this link "snapshot" at the edge of the screen where it will be out of the way of the user. This position is designed to minimize the interference with the page currently displayed. When the user desires to access the page represented by the snapshot, the user would then click on the snapshot which would open the appropriate application to view the page associated with the selected hypertext link.

The third illustrated alternative is one where the user selects the "view later off line" link enhancement. When the user makes this selection in block 130, the enhancement makes copies of the page(s) associated with the selected link and then saves them to hard drive or other storage location for later viewing off line. In essence, the program downloads the page or pages associated with the selected link in the background while the user continues to view the current page and/or follow additional links associated with the current page. The user may be able to select the number or levels of pages to be downloaded.

The toolbar selections represented by blocks 110, 114, 122, 126 and 130 provide five examples of hyperlink enhancements. The addition and creation of additional link enhancements are believed to be within the ordinary scope of the art.

Figure 5:
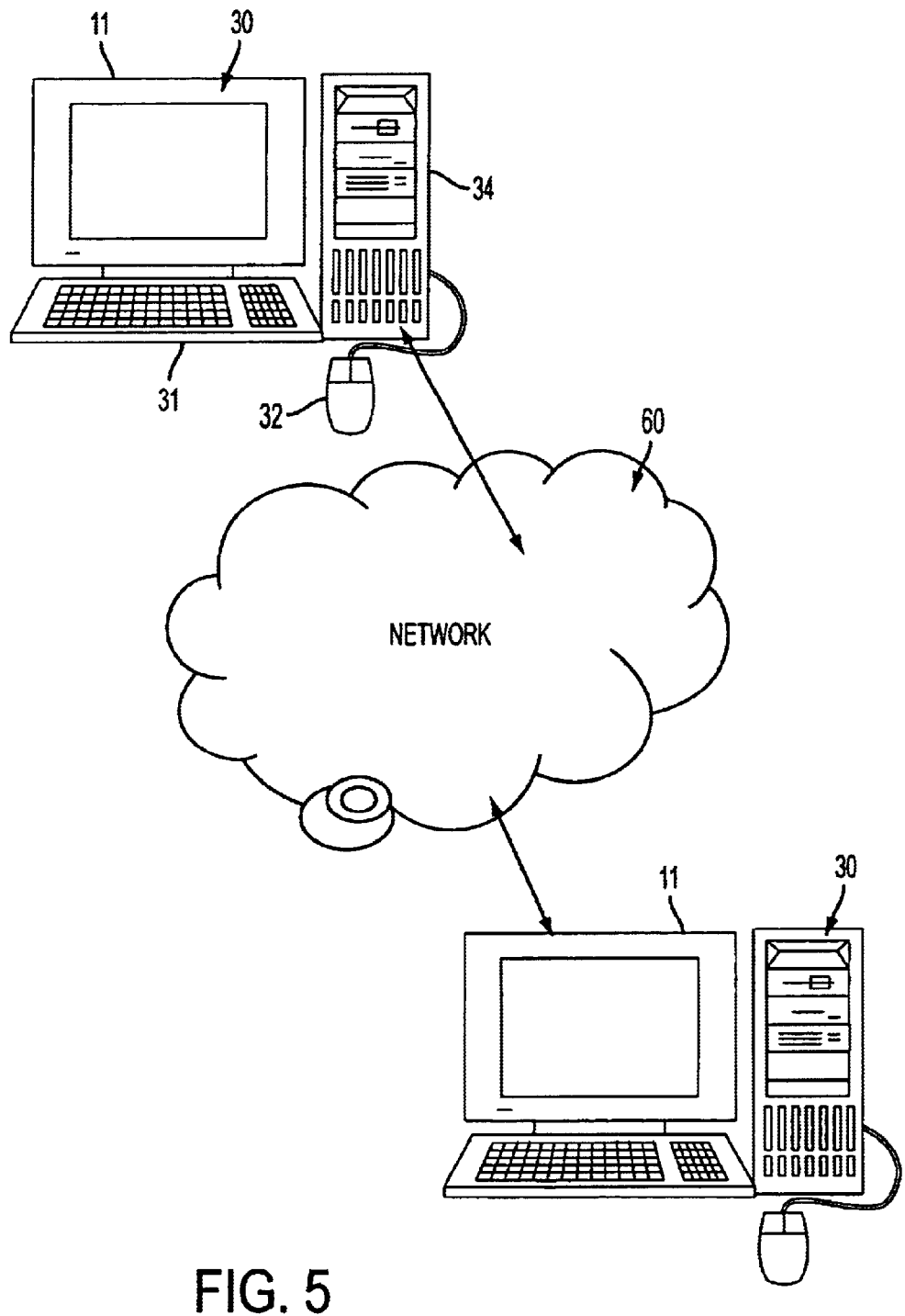
FIG. 5 illustrates a computer utilizing the hyperlink enhancement operating on a network.

The hyperlink enhancement function may operate on a computer 30 (FIG. 5). Computer 30 may be a personal computer (PC) or a server. Typically, computer 30 has a display 11, keyboard 31, and pointing device 32 connected to CPU 34. Computer 30 may be connected to a network 60 that contains hyperlinked pages or may be a stand-alone system.

Figure 6:
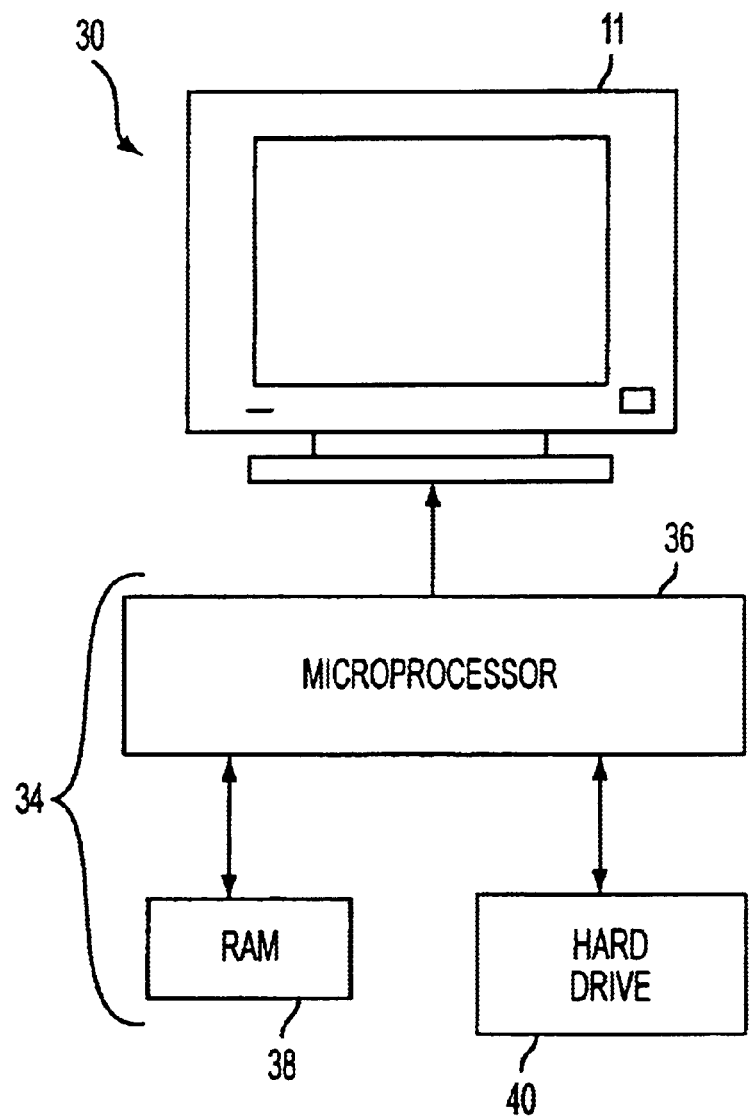
FIG. 6 illustates further details of the computer system illustrated in FIG. 5.
Figure 7:
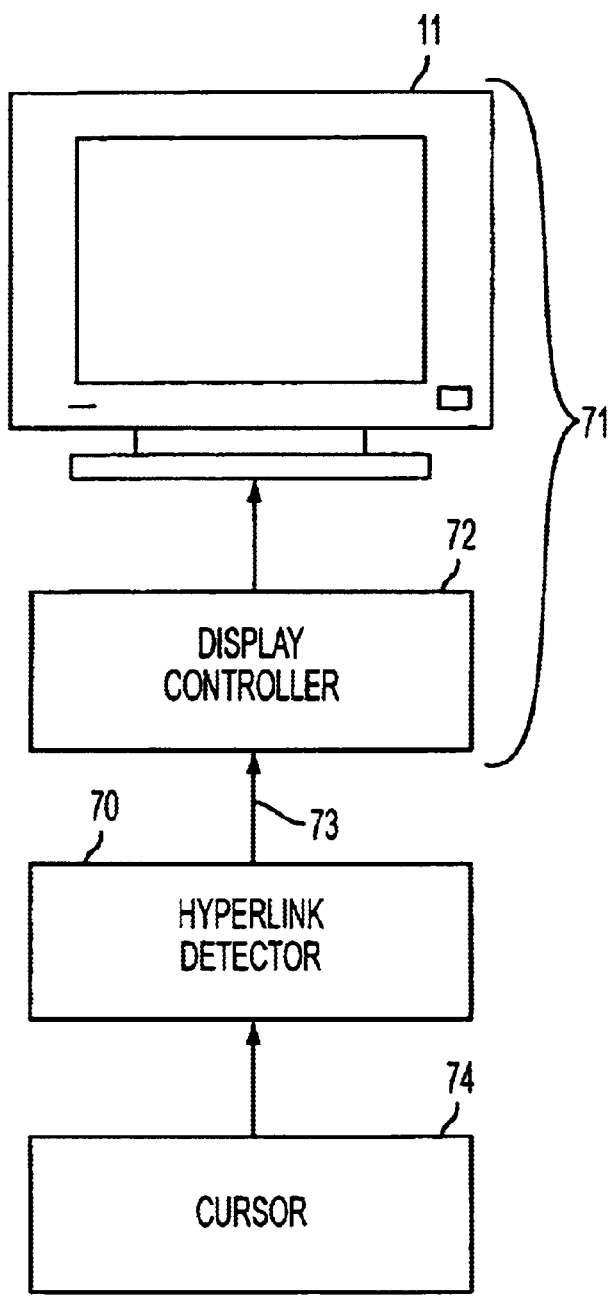
FIG. 7 provides a function block diagram for a hyperlink enhancement device of the present invention.

The CPU 34 typically contains a microprocessor 36, and RAM 38 (FIG. 6). Some CPU's also have some form of mass storage 40, for example a hard drive, CDROM, or DVD. The computer 30 becomes a hyperlink enhancement device 10 when the hyperlink enhancement function is executed. This device 10 has a hyperlink detector 70 and a display system 71. The display system 71 may have a display controller 72 and a display 11. The hyperlink detector 70 may be formed from CPU 34 or microprocessor 36 running a hyperlink enhancement function 10. When the detector 70 detects the presence of a hyperlink near the location provided by cursor 74, the detector 70 sends a toolbar display signal 73 to the display controller 72. Upon receipt of a toolbar display signal 73 the display controller 72 sends a signal to the display 11 to display toolbar 20. The displayed toolbar containing at least one hyperlink enhancement that the user may select. Cursor 74 may be a keyboard 31, a mouse, track ball, or other pointing device 32.

Browser Application Interface

Figure 3:
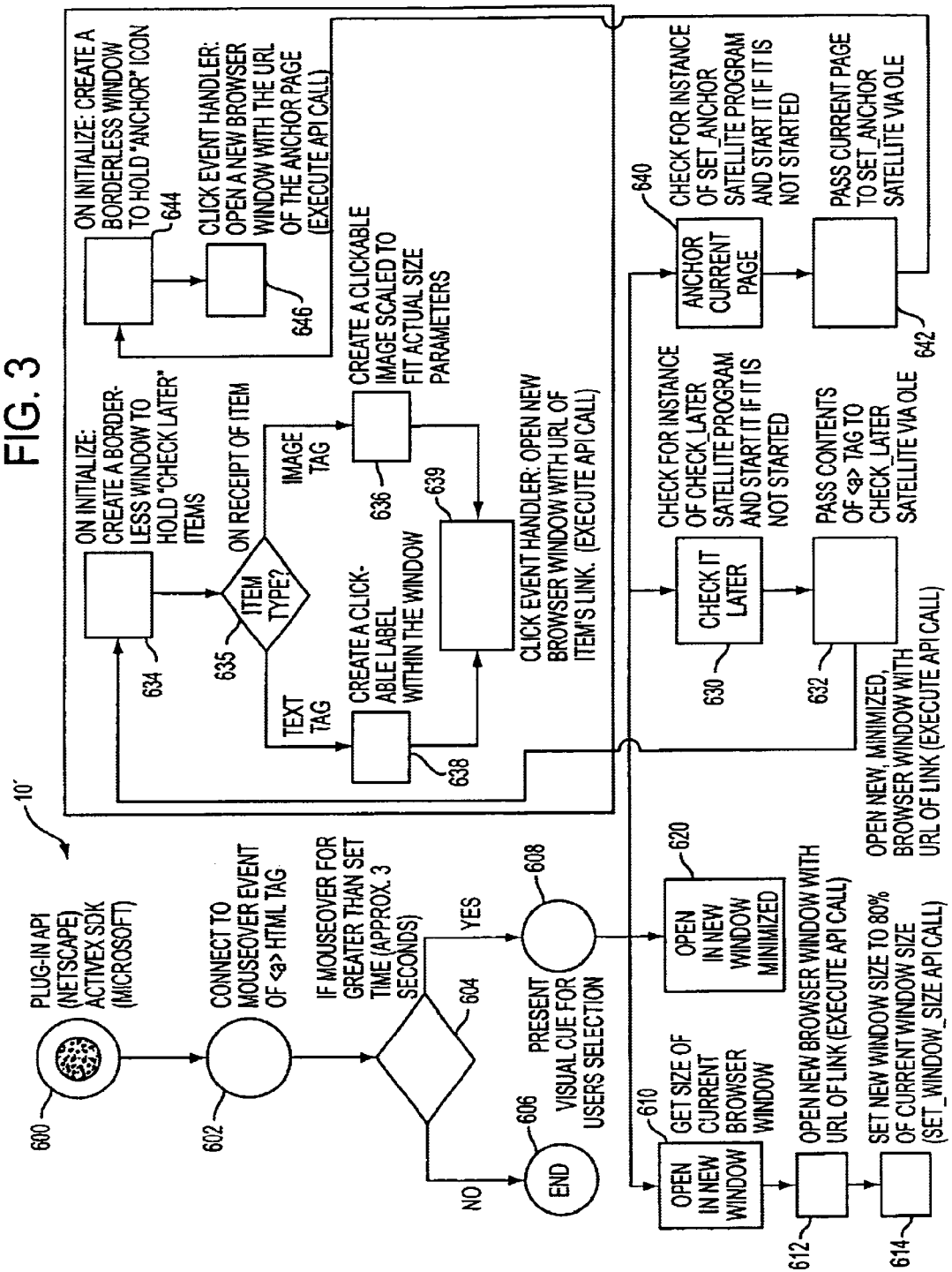
FIG. 3 provides a more detailed exemplary functional flow chart of a first embodiment of the invention of FIG. 1.

FIG. 3 illustrates an exemplary functional flow chart for an enhanced hyperlink 10' that could be utilized as a browser function. For example, a plug-in (Netscape Navigator) or activate x-control (Microsoft Internet Explorer). This functional flow chart was intended for a programmer working in the JAVA programming language. It is expected that based on this flow chart and the specification that a programmer of ordinary skill in the art would be able to create a similar program using other programming languages and/or programming for other hyperlink environments outside that experienced on the Internet. Examples of such hyperlink environments include, but are not limited to, Folio Views and other text-based hyperlinked document retrieval systems utilized in storing and accessing large volumes of text such as encyclopedias, magazine archives, and/or other text archives whether stored on hard drives, CD-Roms, DVDs or other storage media.

The functional flow chart illustrated in FIG. 3 begins at block 600 with the browser in operation. The enhanced hyperlink 10' illustrated overrides the mouse-over event for the hyperlink object in block 602. A typical mouse-over event, which is part of the typical browser interface, is when the cursor changes from one shape to a second shape when the cursor is placed over a hyperlink. For example, if the cursor was an arrow, in normal circumstances, this could change to a hand when the cursor was placed over a hyperlink. Alternatively, the enhanced hyperlink 10' may just detect the presence of the hyperlink based on the mouse-over event and not override this event.

In the illustrated implementation, the program activates if the user left the cursor in place for at a set period of time, illustrated by block 604. Alternatively, the program may activate anytime the cursor is over a hyperlink. Upon detecting this occurrence, the program may override the typical (standard pre-programmed) mouse-over event with the enhanced hyperlink action in block 608. Alternatively, the enhanced hyperlink 10' may just detect the presence of the hyperlink based on the mouse-over event and not override this event. Thereafter, the toolbar selected by the programmer is displayed. The toolbar provides one method for the user to select the particular link enhancement that the user desires to utilize. The user may decide not to utilize any of the enhancements represented by blocks 610, 620, 630 and 640 and the enhanced hyperlink 10' would end as illustrated by block 606.

When the user decides to select one of the enhanced link features, flow moves through that function's starting block (610 for Open in a New Window, 620 for Open in New Window Minimized, 630 for Check it Later, and 640 for Anchor Current Page). An exemplary toolbar is illustrated in FIG. 2. Toolbar 20 is illustrated overlying advertisement 18 in FIG. 2. It is expected that it would be within the ordinary skill in the art for a programmer to design an alternative toolbar to permit the user to select the particular link enhancement that they desired to use. FIG. 3 illustrates four exemplary functions that may be utilized as link enhancements. Block 610 represents the user selecting the "Open in New Window" function. Thereafter, the illustrated link enhancement uses Application Programming Interface (API) calls to open a new browser window and size it or place it so that it does not completely obliterate the view of the original browser window as illustrated in blocks 612 and 614.

A second function entitled "Open in new window Minimized" begins in block 620. The illustrated link enhancement uses API calls to open a new browser window in the minimized state (so it shows up as an icon or is displayed on the system taskbar or toolbar).

The third illustrated function begins in Block 630. The "check it later" function in this implementation utilizes a satellite program to manage the hyperlinks that the user desires to save for later access. First, the function checks to see if the Check_Later satellite function is running. If the satellite function has not yet started, then it is initiated. Thereafter, the contents of the hyperlink tag are passed to the Check_Later satellite via Object Linking and Embedding (OLE) (or some other inter-process communication scheme) in block 632. When the Check_Later satellite receives a hyperlink tag for the first time, the program creates a window to hold Check_Later items in Block 634. Thereafter, the satellite may determine if the contents of the hyperlink tag contains art and/or text in decision 635. If the item is a text tag, the program flow moves to block 638 where a clickable label is created within the window created in block 634. If the item is an image tag, the program flow moves to block 636 where a clickable image is created within the window created in block 634. The information passed in provides everything necessary for the satellite to set up a click event handler in block 639 which would launch the appropriate link in a new browser window when the user clicked on the saved hyperlink.

The function titled "Anchor Current Page" begins in block 640. In this implementation, the satellite program approach has also been utilized. For this function, the URL of the current page must be passed to the satellite as shown in block 642. This is all that the satellite needs to display an Anchor icon on the desktop in block 644 and to set up a click event handler which would reopen the current page in a new browser window when the user clicked on the anchor icon as illustrated in block 646.

FIG. 3 illustrates four exemplary link enhancements to illustrate various link enhancements. It is believed that other link enhancements based on this disclosure and the flow charts could be easily produced.

JAVA Virtual Machine Application Programming Interface

Figure 4:
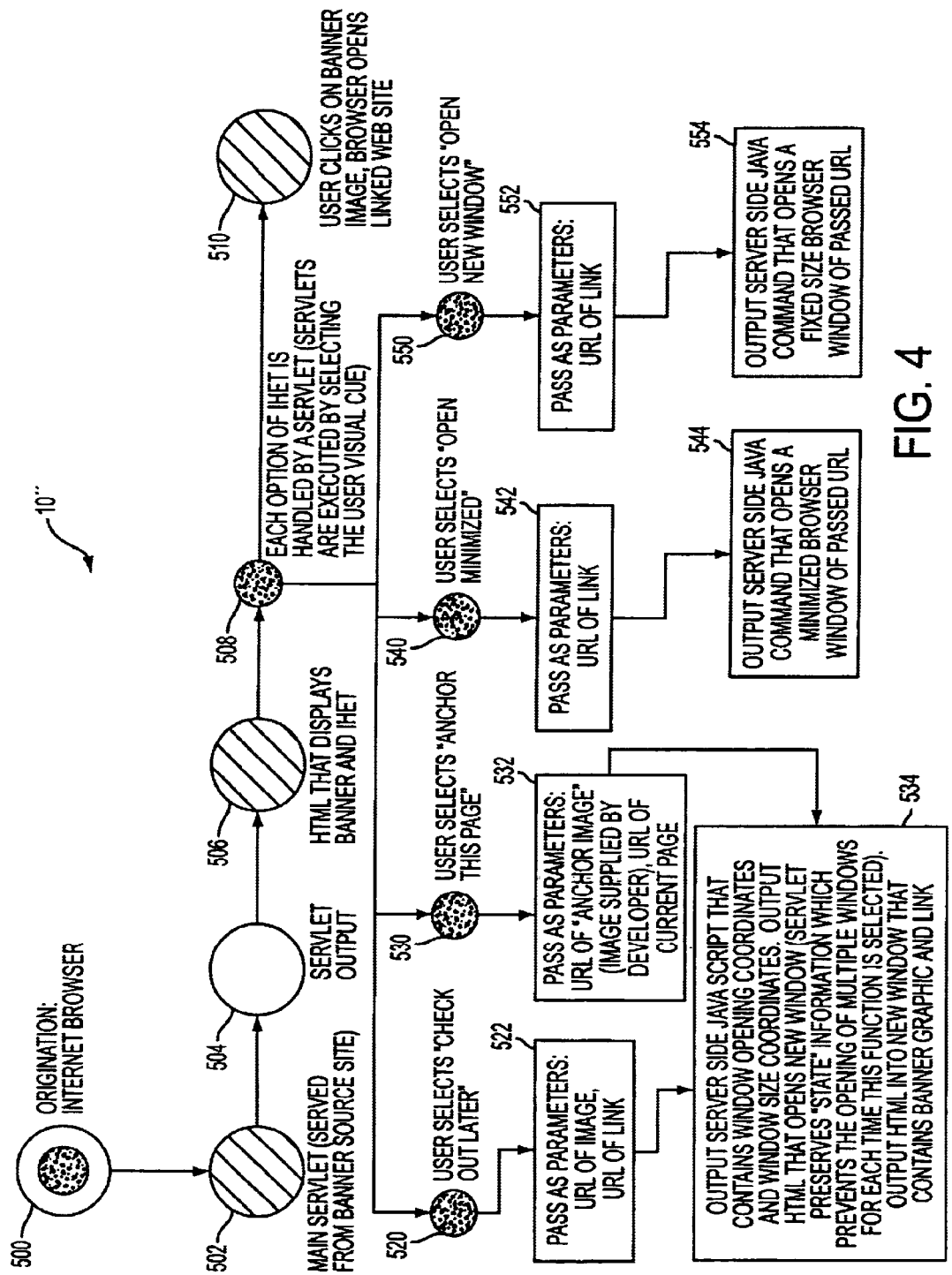
FIG. 4 shows an exemplary flow chart of a second embodiment of the invention illustrated in FIG. 1.

FIG. 4 illustrates a second embodiment of the hyperlink enhancement 10", which enables a hyperlink to have the enhancements discussed above for a browser without the user having to have the function discussed above running with or as part of their browser. Block 500 represents the user making a call for a particular page. Thereafter, the main function may be served from the hyperlink source site in block 502. Alternatively, the function may be served from the page site in block 502. Thereafter, in block 504, the function would be downloaded to the users' computer and the page containing the hyperlink would be displayed in block 506. This page may contain either a banner ad with an enhanced hyperlink or other enhanced hyperlink. In block 508 the user is given the opportunity to select which link enhancement they desired as discussed above in FIG. 3 at block 608.

When the user clicks on the selected hyperlink in block 510, the browser performs its normal function and opens the page. However, if the user selects one of the link enhancements represented by blocks 520, 530, 540, or 550, then the particular link enhancement associated with that selection is executed.

If the user selects the "check out later" link enhancement in block 520 then the function in block 522 passes as parameters the uniform resource locator (URL) of the selected link's image, if an image is displayed, and the URL of the selected hyperlink to a function. For example, this function may be a JAVA servlet, applet, or script. In block 534, the function provided by the server outputs Java Script and HTML code that opens a new window containing the graphics and/or text and hyperlink. Preferably, the function preserves the "state" information, which prevents opening a new window each time this particular enhancement is selected. A follow on "check out later" function call places the graphics and/or text and hyperlink of the selected link in the existing "check out later" window.

If the user selects "anchor this page" the associated function would be called in block 530. This function passes as parameters the URL of the "anchor image", which may be supplied by the developer or selected by the user, and the URL of the current page to the function in block 534 as discussed above.

If the user selects "open a new window minimized" then the associated function would be called at block 540. The function passes as parameters in block 542 the URL of the selected link to a server side command in block 544. This command opens a minimized browser window of the selected hyperlink on the users computer.

If the user selects the link enhancement titled "open new window" then the associated function in block 550 is called.

Thereafter the function passes as parameters the URL of the selected hyperlink to a server side command. In block 554, the server side command opens a fixed sized browser window with the selected hyperlink. The size of this window may be preprogrammed by the programmer or may be selectable by the user as part of the set up routine.

Other Enhancements

This invention provides a platform for many enhancements to the current hyperlink. Several potential enhancements are outlined below. It is expected that these and other hyperlink enhancements could be programmed by a programmer of ordinary skill in the art given this disclosure.

"Capture the Hyperlinked Pages for later viewing". This feature, invisibly to the user, saves the pages referenced by the hyperlink to the users hard drive for later viewing at the users discretion. This is beneficial to any user, but particularly to users with slow connections to the Internet. This feature enables users to see what the hyperlink would have presented to them, even if the user doesn't have a live Internet connection at the time of this later viewing, because the pages are saved to the users' local hard drive.

"E-mail more information". This feature, would prompt for e-mail address and allow advertisers to send more information to users who express interest in this way. This way a user can gather more information without necessarily having to follow the link.

"Statistical Information". This feature, would allow advertisers to track statistics related to how, how much, when and under what circumstances their advertisements were being utilized.

"Sweepstakes Information". This feature would allow advertisers to add "sweepstake" entry information to the "toolbar" enabling users to enter the sweepstakes without losing their train of thought.

In summary, numerous benefits have been described with results from implying the concepts of the invention. The foregoing description of the preferred embodiment with the invention has been prepared for the purposes of illustration and description. It is not intended to be exhaustive or to limit the invention to the precise form disclosed. Obvious modifications and variations are possible in light of the above teaching. The embodiment was chosen and described in order to best illustrate the principals of its invention in its practical application to thereby enable one of ordinary skill to best utilize the invention of various embodiments and with various modifications as they are suited to the particular to which is contemplated. It is intended that the scope of invention be defined by the claims appended hereto.

We claim:

1. A method for enhancing a hyperlink, comprising:
   displaying a hyperlink in a first window of an application, wherein said hyperlink is associated with a uniform resource locator (URL) and a page;
   detecting a cursor in proximity to said hyperlink;
   displaying a graphical toolbar in proximity to said cursor while said cursor is in proximity to said hyperlink, wherein said graphical toolbar is adapted to provide a plurality of user-selectable link enhancements, said plurality of user-selectable link enhancements comprising a user-selectable link enhancement to display a link snapshot based on said hyperlink;
   receiving a first user selection of said link enhancement; and
   as a result of said first user selection,
       capturing a displayable element and said URL associated with said hyperlink; and displaying a link snapshot, wherein said link snapshot comprises said captured displayable element, and is associated with said captured URL, and wherein said link snapshot is adapted to cause said page to be displayed as a result of a second user selection of said link snapshot, said page to be displayed based on said captured URL.

2. The method of claim 1, wherein capturing said displayable element further comprises:

reducing the size of said captured displayable element.

3. The method of claim 1, wherein said link snapshot is displayed at an edge of a display displaying said first window.

4. The method of claim 1, further comprising:

displaying said page in a second window upon said second user selection of said link snapshot.

5. The method of claim 1, further comprising:

retaining said link snapshot when said first window is closed.

6. The method of claim 1, wherein said capturing and said displaying said link snapshot are performed by a second application.

7. The method of claim 1, wherein said displayable element comprises a graphic element.

8. The method of claim 1, wherein said displayable element comprises a text element.

9. A method for enhancing a hyperlink, comprising:

displaying a first page having a hyperlink in a first window of an application, wherein said first page is associated with a first uniform resource locator (URL), wherein said hyperlink is associated with a second URL and a second page;

detecting a cursor in proximity to said hyperlink;

displaying a graphical toolbar in proximity to said cursor while said cursor is in proximity to said hyperlink, wherein said graphical toolbar is adapted to provide a plurality of user-selectable link enhancements, said plurality of user-selectable link enhancements comprising a user-selectable link enhancement to display an icon based on said first URL;

receiving a first user selection of said link enhancement; and as a result of said first user selection, capturing said first URL associated with said first page;

displaying an icon, said icon associated with said captured first URL, said icon adapted to cause said first page to be displayed as a result of a second user selection of said icon; and displaying said second page in said first window.

10. The method of claim 9, wherein said icon is displayed at an edge of a display displaying said first window.

11. The method of claim 9, wherein said icon is displayed as a button in said graphical toolbar.

12. The method of claim 9, wherein said capturing and said displaying said icon are performed by a second application.

13. A method for enhancing a hyperlink, comprising:

displaying a first page having a hyperlink in a first window of an application, wherein said first page is associated with a first uniform resource locator (URL), wherein said hyperlink is associated with a second URL and a second page;

detecting a cursor in proximity to said hyperlink;

displaying a graphical toolbar in proximity to said cursor while said cursor is in proximity to said hyperlink, wherein said graphical toolbar is adapted to provide at least one user-selectable link enhancement selected from a user-selectable link enhancement to display a link snapshot based on said hyperlink, a user-selectable link enhancement to display an icon based on said first URL, a user-selectable link enhancement to store a copy of said second page, and a user-selectable link enhancement to display said second page in a second window; and receiving a first user selection of one of said user-selectable link enhancements.

* * * * *